Oct. 8, 1935.  E. J. BUSSING  2,016,590
METHOD OF FINISHING RUBBER ROLLERS
Filed Feb. 20, 1935  2 Sheets-Sheet 2
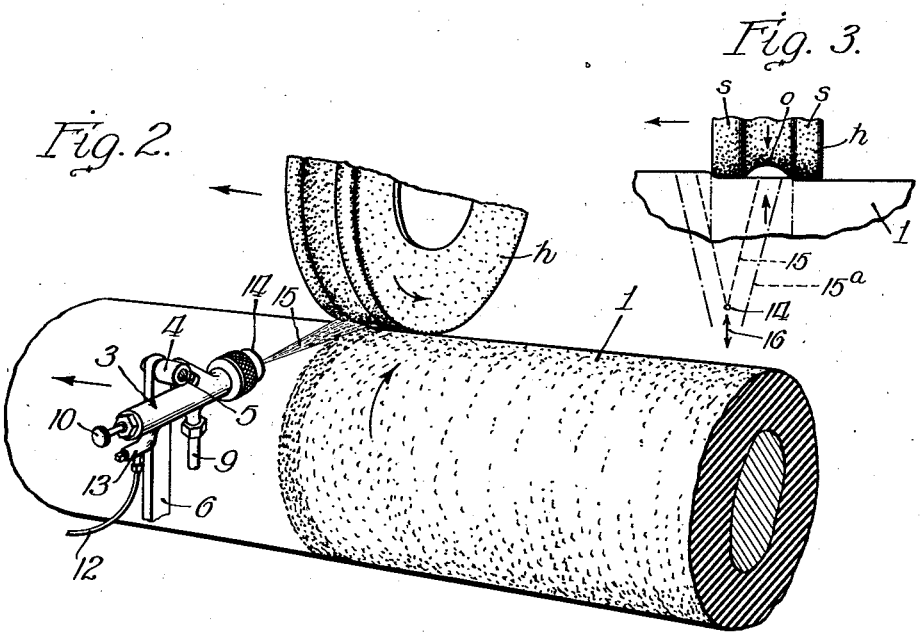
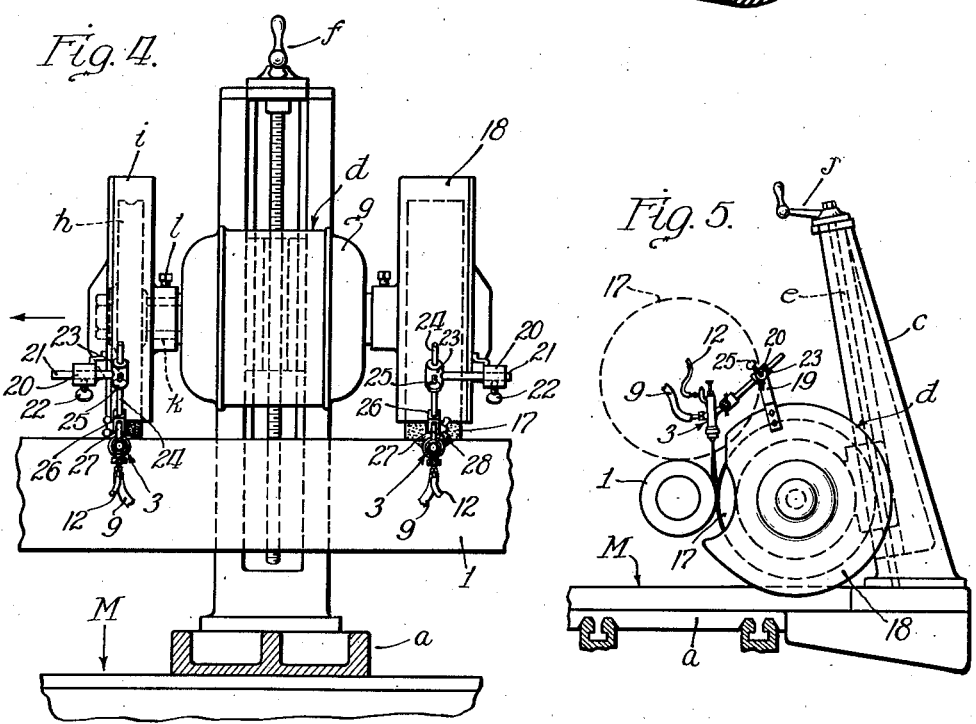
Inventor:
Elmer J. Bussing Patented Oct. 8, 1935

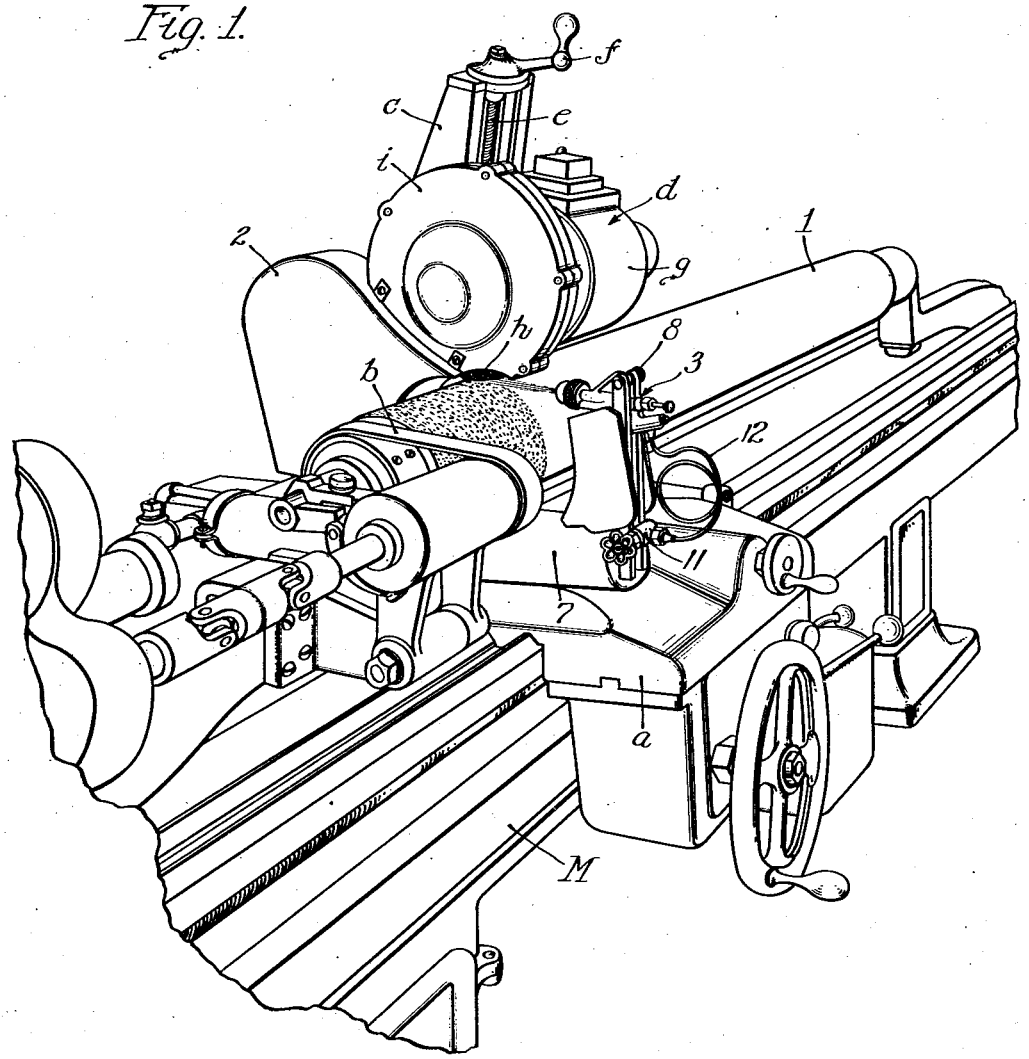

2,016,590

UNITED STATES PATENT OFFICE 2,016,590

METHOD OF FINISHING RUBBER ROLLERS

Elmer J. Bussing, Chicago, Ill., assignor to The Chicago Daily News, Inc., Chicago, Ill., a corporation of Illinois Application February 20, 1935, Serial No. 7,350

16 Claims. (Cl. 51—278)

This invention relates to the finishing of articles formed of rubber compound and materials of like nature, and has to do more particularly with the finishing of rubber rollers such as are used in printing presses.

Rubber rollers are now used extensively in printing presses, particularly high speed presses, for transferring the ink from the fountains to the form or plates and placing it upon the latter in a thin film. It is essential, in order to produce satisfactory results, that the form rollers, particularly, have a smooth and uniformly polished surface to assure that the ink is spread upon the plates or forms uniformly and that only the surface of the plate is inked, in order to produce clear printing which is clean and sharp while assuring the production of half-tones that are attractive and neat in appearance and solids that produce the desired contrast and neatness of appearance. Rubber rollers absorb the ink and, as a result, swell in use, which necessitates grinding of the roller after it has been in use for a length of time, depending, to a considerable extent, on the conditions of use.

It is the present practice to grind rubber rollers, particularly the form rollers of printing presses, in lathes or grinding machines in which the roller is rotated at low speed and is subjected to the action of an abrasive grinding wheel driven at high speed, the wheel and the roller having relative movement lengthwise of the latter. While this treatment of the roller is known in the trade as grinding, it is, in fact, a cutting operation. The grinding wheel used should be of coarse grit and, during rotation of this wheel in contact with the roller, the particles of grit at the periphery of the wheel act as cutting edges which engage the rubber of the roller and pull it from the latter in the form of rubber threads, which, while under tension, are then cut from the roller, the operation being in the nature of a shredding and cutting operation rather than a truly grinding operation. This pulling and cutting of the rubber from the roller tends to produce a pitted and scaled effect on the latter and, in order to avoid the formation of an objectionably rough surface on the roller, it is necessary that the grinding wheel be driven at high speed, the higher the speed the better, in order that it may instantaneously cut the rubber from the roller. On the other hand, high speed rotation of the grinding wheel, while essential, introduces certain difficulties which it has heretofore been found impossible to obviate.

Rubber rollers such as are commonly used in printing presses and for analogous purposes comprise a metal core upon which the first layer of rubber is secured with a permanent bond, in a known manner, and the body of the roller is then built up in layers or laminations which are secured together by a suitable adhesive, after which the roller is cured and trimmed to size in a known manner. As above noted, in use the roller absorbs the ink which contains a considerable proportion of oil. In grinding such a roller in accordance with present practice, the grinding wheel is, of necessity, driven at high speed with the result that the roller is quickly heated to a high temperature, since the rubber compound of the roller is inherently a friction material. This heating of the roller produces considerable smoke, which is in itself objectionable, and also heats the rubber roller to a high temperature which in many cases causes serious injury thereto, and may cause separation of the plies or laminations of the roller, thus rendering it unfit for use. This heating effect of the grinding wheel on the roller may necessitate interrupting the finishing operation and reduces the speed thereof. A further objection to this heating effect is that, in many instances, it heats the oil within the rubber to such an extent as to produce localized pockets of oil vapor under considerable pressure which expand and rupture the outer surface of the roller, leaving it in a highly porous and objectionably rough condition, which condition it is extremely difficult, and frequently impossible, to remove by subsequent polishing of the roller. It has been attempted to avoid the above difficulties of the present practice by running water over the roller during the grinding operation. This has proved to be unsatisfactory, since water run onto the roller in this manner forms a thick layer or covering of water upon the roller which causes slippage between the latter and the grinding wheel, with the result that the roller is not ground uniformly and is in an extremely rough and unsatisfactory condition after the grinding operation. Also, flowing of the water onto the roller in this manner has proved to be unsatisfactory for cooling the latter and, even where water is used, injury to the roller may occur. It has also been proposed to direct a blast of air onto the roller, during the grinding operation, with the object of preventing objectionable heating thereof. But this has proved to be unsatisfactory, since an air blast is inadequate for this purpose, and possesses no lubricating properties such as would tend to reduce the great amount of friction between the roller and the grinding wheel. While it has been proposed to use water and to use air during the grinding operation, neither has proved satisfactory for the reasons above noted.

In order to avoid objectionable heating of the roller during the grinding operation, it is desirable that the roller be effectively cooled and also be lubricated to a certain extent, but it is necessary, on the other hand, that the lubrication of the roller be insufficient to cause slippage between the roller and the grinding wheel during the grinding operation. The method of my invention is directed primarily to avoiding the above noted objections to the present practice in grinding rollers. More specifically, my invention is directed to a method in which both air and water are employed in the grinding operation in such manner as to assure effective cooling and lubrication of the roller to such an extent that objectionable heating of the latter is eliminated and a smooth and uniform surface on the roller is assured. In general, the method of my invention is directed to the grinding of the roller as a continuous operation, while assuring a smooth and uniform finish on the roller, effecting a material saving of time in the grinding operation while also avoiding injurious heating of the roller. It is also an object of my invention to provide a method by which the roller may be ground and polished simultaneously and as a continuous operation. Further objects and advantages of my invention will appear from the detail description.

In the drawings:—

Figure 1 is a perspective front view, partly broken away, of a grinding machine and attachments therefor, for practicing the method of my invention;

Figure 2 is a fragmentary perspective view of a roller and a grinding wheel, in conjunction with an atomizer, illustrating the method of my invention;

Figure 3 is a fragmentary front view, partly broken away, of the roller and the grinding wheel, illustrating the method of my invention;

Figure 4 is a fragmentary front view of a grinding machine and associated means, with a roller mounted therein, illustrating a modification of my method, for grinding and polishing the roller;

Figure 5 is a transverse vertical sectional view through the grinding machine of Figure 4, looking toward the polishing wheel end of the grinding and polishing unit, the latter being shown as disposed to contact the roller at the rear thereof.

In illustrating the method of my invention I have shown a grinding machine M of suitable type for grinding rubber rollers and like articles. The machine illustrated is manufactured by Black Rock Mfg. Co., of Bridgeport, Connecticut, is of known type and need not be described in detail. Suffice it to say that this machine comprises a carriage $a$, slidable lengthwise of the machine, means for feeding the carriage in either direction at desired speed, means for rotatably supporting a rubber roller $l$, means for driving this roller at desired speeds comprising a belt drive $b$, a support $c$ movable with the carriage and adjustable transversely of the machine, and a grinding unit $d$ slidably mounted on support $c$ and adjusted upward and downward on the latter by means of a screw $e$ to the upper end of which is secured an adjusting lever $f$. The grinding unit comprises an electric motor $g$ of suitable type upon the armature shaft of which is secured a grinding wheel $h$, this wheel being enclosed, for the greater portion of its circumference, within a guard $i$ conveniently mounted for turning movement on a hub $k$ (Figure 4) projecting from the end of the casing of motor $g$, guard $i$ being secured in adjustment by a set screw $l$, or in any other suitable manner. Wheel $h$ is driven at high speed in a clockwise direction, as viewed in Figure 1, roller $l$ being rotated in the same direction, but at low speed, it being noted however that the roller may be rotated oppositely to the grinding wheel, if desired. Conveniently, a sheet metal hood 2 is removably secured to guard $i$ and extends downward and rearward therefrom to direct downwardly the material removed from the roller by the grinding wheel.

During the grinding operation, wheel $h$ is held in contact with the roller $l$ so as to remove the rubber therefrom to the desired depth, usually $\frac{1}{32}$nd of an inch or less. This wheel is provided with a central depression or groove $o$ (Figures 2 and 3) at each side of which is a grinding surface $s$. Preferably, this wheel is driven at the maximum speed at which it can safely be driven in view of mechanical considerations, and has a peripheral speed of approximately 9000 feet per minute. With the carriage moving toward the left, as indicated by the arrows in Figures 2 and 3, the leading surface $s$ of the wheel removes from roller $l$ rubber to a slight depth, the portion of the roller contiguous to and following this surface of the wheel may expand slightly into the groove $o$, and the following surface $s$ of the wheel removes a further amount of rubber from the roller to a slight depth. The groove $o$ in the wheel is primarily for facilitating the second cut by the grinding wheel, but this groove also provides for ventilation with a view to preventing excessive heating of the wheel. However, if the wheel be driven at high speed, as is necessary for satisfactory grinding of the roller, excessive heating of the roller and the wheel, with resulting unsatisfactory grinding of, and possible injury to the roller occurs, and this objectionable heating cannot be avoided either by running water onto the roller or by directing a blast of air against the roller and the wheel, as above noted. It should also be noted, in connection with the heating of the roller and the wheel, that the wheel is frequently injured by excessive heating thereof, causing chipping and breaking out of parts of the wheel and necessitating dressing thereof before it can again be used satisfactorily.

I have found that the excessive heating of the roller and the wheel can be avoided by directing onto the roller a slight amount of cooling liquid, conveniently water, atomized by compressed air so as to produce an extremely fine spray or mist of water which serves to lubricate the roller slightly so as to facilitate the grinding or cutting operation while avoiding depositing of water upon the roller in such amount as to cause slippage between the roller and the grinding wheel. The water thus deposited upon the roller is in the form of minute particles or globules, which, upon contacting the roller, readily evaporate, thus absorbing a considerable portion of the heat generated by the grinding operation. The air employed in the atomizing of the water is also of assistance in cooling the roller and the grinding wheel, this air expanding and flowing lengthwise of the roller for a considerable distance to either side of the grinding wheel and supplementing the cooling action of the water spray or mist. In this manner, the water and the air cooperate to assure effective cooling of the roller and the grinding wheel to such an extent that the roller may be ground in one continuous operation from end to end thereof without objectionable heating and resulting smoking of and injury to the roller. This effects a great saving in time in grinding of the roller while avoiding injury thereto and assuring a much smoother and more uniform finish on the roller than is possible by the present grinding methods above referred to, a contributing factor to this smooth and uniform finish of the roller being the high speed at which the grinding wheel may be driven when this wheel and the roller are cooled by the use of an atomized spray of air and water or other suitable cooling liquid, in accordance with my method.

Any suitable means may be provided for directing an atomized spray of air and water onto the roller. In Figure 1 of the drawings I have shown an atomizer 3 supported by a sleeve 4 on a pin 5 passing through the upper ends of two uprights 6 secured at their lower ends to a water tank 7 suitably mounted on carriage $a$ of the grinding machine. A knurled thumb nut 8 screws upon one end of pin 5 and provides convenient means for securing the atomizer in adjustment on this pin by clamping sleeve 4 between the upper ends of the uprights 6. A tube 9 connects atomizer 3 to tank 7 below the water level therein and a valve 10 controls the amount of water supplied through tube 9. This tube 9 may be a rigid tube extending into tank 7, suitable means of known type being provided for effecting a tight closure between this tube and the tank while permitting relative movement of the tube in the adjustment of the atomizer, or the tube 9 may be a flexible tube. Air under pressure, approximately 80 pounds pressure to the square inch, is supplied from a suitable source of supply to a valve 11, and thence through a coiled tube 12 to air connection 13 of the atomizer. The atomizer itself is, in general, of known type and need not be illustrated nor described in greater detail. Preferably, this atomizer is provided with a nozzle 14 so shaped that the atomized stream of air and water is projected therefrom in the form of a flat sheet, the width of which extends substantially parallel to the roller 1. The atomizer is so disposed that the sheet of atomized air and water is directed into the space between the roller and the portion of the grinding wheel $h$ projecting forwardly of the roller beyond the area of contact between the latter and the grinding wheel. This spray is preferably directed substantially tangent to the roller and so as to strike the latter at or about the area of grinding, that is, the area of contact between the grinding wheel and the roller. The atomized spray of air and water flares toward the roller, as indicated in Figure 3, and the atomizer may be adjusted toward or away from the roller, in any suitable or well known manner, for varying the effective area of this spray. Referring to Figure 3, with the atomizer disposed so that the outlet of the nozzle 14 occupies the position shown in this figure, which may be taken as the position shown in Figure 2, the spray is indicated at 15. If the atomizer be moved outward away from the roller, as indicated by the arrow 16, the spray in this latter position of the atomizer may be taken as indicated at 15$a$. In this manner, the effective width of the spray directed onto the roller may be varied as required. It will be seen that the center line of the spray corresponds approximately to the transverse center of the leading cutting surface $s$ of the grinding wheel $h$, the spray extending a short distance to each side of this leading surface $s$. Accordingly, a portion of the spray of air and finely atomized water is directed onto the roller at the area of contact between the latter and the grinding wheel at the leading portion thereof, and a portion of this spray is directed onto the roller in the neighborhood of the groove $c$ of the grinding wheel, thus effectively cooling both the roller and the grinding wheel. Also, since the spray is directed into the space between the roller and the grinding wheel, it is deflected laterally to a certain extent and spreads along the roller lengthwise thereof, particularly the air, which expands and absorbs heat from the roller so as to cool the latter. The water, in the form of a fine mist, is deposited upon the roller and rapidly evaporates therefrom, thus exerting a considerable cooling effect. In this manner, the roller and the grinding wheel are effectively cooled by the coaction of the air and the water. The water also serves as a lubricant which facilitates the cutting operation and thus reduces the heating effect, it being noted, however, that the amount of water in the spray is slight and is regulated so as to be insufficient to cause slippage between the grinding wheel and the roller. In Figures 4 and 5, I have illustrated means for carrying out a modification of my method by means of which the roller may be ground and polished in a single continuous operation. In this form of the machine, the shaft of motor $g$ is extended beyond the other end thereof and has secured thereon a polishing wheel 17 disposed within a guard 18 similar to guard $i$ and mounted upon the motor structure in the same manner as the latter guard. An atomizer 3 is suitably mounted upon each of the guards $i$ and 18, as by means of a bracket 19 secured to the guard, and provided, at its outer end, with a sleeve 20 slidably receiving a rod 21 secured in adjustment by a set screw 22. Rod 21 is provided at its inner end with a sleeve 23, slidably receiving a rod 24 adjustably secured in sleeve 23 by a set screw 25. Rod 24 is provided at its forward end with a slotted head 26 which receives lug 27 of atomizer 3, the latter being secured in adjustment by screw and wing nut means 28. Water is supplied to the atomizer through tube 9, air being supplied through tube 12. In this manner the atomizer can readily be adjusted to suit conditions.

In the operation of the machine illustrated in Figures 4 and 5, the grinding wheel $h$ and the polishing wheel 17 are rotated in contact with the roller 1, the grinding unit being moved lengthwise of the roller and toward the left, as indicated by the arrow in Figure 4. The grinding wheel serves to grind the roller so as to remove rubber therefrom to a desired depth, as above explained, and thereafter the polishing wheel 17 serves to smooth off and polish the roller. The finely atomized spray of air and water ejected from the atomizers onto the roller adjacent the respective wheels effectively prevents objectionable heating of the roller and the wheels, in the manner previously described. In this connection, the cooling of the roller is beneficial as preventing the rubber thereof from being heated to such an extent as to become sticky or gummy and clog the polishing wheel 17. This enables the polishing operation to be carried on simultaneously with the grinding operation, the grinding and polishing of the roller being performed as a continuous operation. As previously noted, the air employed in the atomizer is under appreciable pressure, preferably approximately 80 pounds to the square inch, and it is possible that a certain amount of the water in the form of a finely subdivided spray or mist, is driven into the pores of the rubber at the surface of the roller and thus assists the cooling thereof and the grinding and polishing operations.

The polishing wheel 17 may be of any suitable or known type. Conveniently, this wheel is a wooden wheel upon which a strip of suitable abrasive material is secured in a known manner. Wheels of this type are known in the art and need not be illustrated nor described in detail.

In Figure 5 of the drawings I have shown the grinding and polishing unit d in position to contact the roller 1 at the back of the latter. As previously stated, the grinding unit is adjustable on the support c and the latter is adjustable on the carriage a transversely of the machine, so that the cutting unit may be disposed above the roller as in Figures 1 to 4, inclusive, or at the back thereof as in Figure 5, the upper position of the grinding and cutting unit being indicated by the dotted line position of grinding wheel 17, in Figure 5. Also, if desired, by moving the grinding and cutting unit d into its extreme lower position, and adjusting the support c to bring this unit into operative relation to the roller, the grinding and the polishing wheels may be brought into contact with the roller at a point below the axis of the latter. This adjustability of the grinding and polishing unit, and of the grinding unit shown in Figures 1 to 3, inclusive, permits of the roller being ground to suit the conditions of use thereof, as will be understood by those skilled in the art.

While the action of the wheel h on the roller is generally known in the art as grinding, and this term has been used in describing my invention, it is really a cutting operation, as previously noted. It is known to subject rubber rollers to a cutting or grinding operation by means of circular knives having keen cutting edges, or provided with teeth analogous to saw teeth or those of milling cutters, and like devices. Such devices are, broadly considered, similar in their action to the grinding wheel disclosed herein. While I prefer to use an abrasive wheel for grinding or cutting the rubber from the roll, it is to be understood that the term grinding wheel, as used herein, comprehends either an abrasive wheel or any other suitable cutting device which acts upon the roller in substantially the same manner as the grinding wheel h, which I have shown as an example of a suitable grinding or cutting device, and the appended claims are to be construed accordingly.

While I have illustrated my invention, by way of example, as used for finishing form rollers which absorb ink, its application is not limited to this particular type of rollers. Form rollers have been made of materials which do not absorb ink, but which require refinishing after being used for some time and, during the refinishing operation in accordance with present practice, are apt to heat to an objectionable extent in the same manner as rubber rollers. The method of my invention can be used to advantage in finishing rollers of this type. In its broader aspects, my invention comprehends finishing rubber articles of various types, it being understood that the term "rubber" as used herein means materials having characteristics which render finishing thereof difficult for the reasons above stated, as well as rubber and compounds thereof.

What I claim is:—

1. The method of finishing rubber rollers for printing presses, which comprises subjecting the roller to the action of a grinding wheel driven at high speed while imparting relative movement to the wheel and the roller lengthwise of the latter, and directing onto the area of the roller being ground a fine spray of a cooling liquid and air under pressure, the liquid being atomized by the air and regulated in amount insufficient to form a film of liquid on the roller sufficient to cause slippage between the latter and the grinding wheel, thereby preventing objectionable heating of the roller and assuring smooth and uniform grinding thereof.

2. The method of finishing rubber rollers for printing presses, which comprises subjecting the roller to the action of a grinding wheel driven at high speed while imparting relative movement to the wheel and the roller lengthwise of the latter, and directing into the grinding zone, by means of a compressed air atomizer, a fine spray of air and a cooling liquid in slight amount, thereby preventing objectionable heating of the roller and assuring smooth and uniform grinding thereof.

3. The method of finishing rubber rollers for printing presses, which comprises subjecting the roller to the action of a grinding wheel driven at high speed while imparting relative movement to the wheel and the roller lengthwise of the latter, and directing into the space between the roller and the portion of the grinding wheel beyond the area of contact thereof with said roller, and transversely of the latter, by means of a compressed air atomizer, a fine spray of air and a cooling liquid in slight amount, thereby preventing objectionable heating of the roller and assuring smooth and uniform grinding thereof.

4. The method of finishing rubber rollers for printing presses, which comprises subjecting the roller to the action of a grinding wheel driven at high speed while imparting relative movement to the wheel and the roller lengthwise of the latter, and directing onto the roller and into the space between the latter and the portion of the grinding wheel beyond the area of contact thereof with said roller an atomized spray of air and a cooling liquid in slight amount, with the spray directed substantially transversely of said roller, thereby preventing objectionable heating of the roller and assuring smooth and uniform grinding thereof.

5. The method of finishing rubber rollers for printing presses, which comprises subjecting the roller to the action of a grinding wheel driven at high speed on an axis substantially parallel to the axis of said roller, while imparting relative movement to the wheel and the roller lengthwise of the latter, and directing onto the roller and into the space between the latter and the portion of the grinding wheel beyond the area of contact thereof with said roller an atomized spray of air and water in slight amount, with the spray directed substantially transversely of said roller, thereby preventing objectionable heating of the roller and assuring smooth and uniform grinding thereof.

6. The method of finishing rubber rollers for printing presses, which comprises subjecting the roller to the action of a grinding wheel driven at high speed on an axis substantially parallel to the axis of said roller, while imparting relative movement to the wheel and the roller lengthwise of the latter, and directing an atomized spray of air and water in slight amount onto the roller transversely thereof and at approximately the area of contact between said grinding wheel and said roller, thereby preventing objectionable heating of the roller and assuring smooth and uniform grinding thereof.

7. The method of finishing rubber rollers for printing presses, which comprises subjecting the roller to the action of a grinding wheel driven at high speed on an axis substantially parallel to the axis of said roller, while imparting relative movement to the wheel and the roller lengthwise of the latter, and rotating said roller independently of the grinding wheel at relatively low speed, and directing an atomized spray of air and water in slight amount onto the roller transversely thereof and at approximately the area of contact between said grinding wheel and said roller, thereby preventing objectionable heating of the roller and assuring smooth and uniform grinding thereof.

8. The method of finishing rubber rollers for printing presses, which comprises subjecting the roller to the action of a grinding wheel driven at high speed on an axis substantially parallel to the axis of said roller, while imparting relative movement to the wheel and the roller lengthwise of the latter, and directing an atomized spray of air and water in slight amount, and in the form of a substantially flat sheet with its width approximately parallel with the roller, onto said roller transversely thereof and at approximately the area of contact between said grinding wheel and said roller, thereby preventing objectionable heating of the roller and assuring smooth and uniform grinding thereof.

9. The method of finishing rubber rollers, which comprises subjecting the roller to the action of a grinding wheel driven at high speed on an axis substantially parallel to the roller while rotating said roller at relatively low speed and imparting relative movement to the wheel and the roller lengthwise of the latter, and directing an atomized spray of air and water in slight amount onto the roller transversely thereof and at approximately the area of contact between said grinding wheel and said roller, thereby preventing objectionable heating of the roller and assuring smooth and uniform grinding thereof.

10. The method of finishing rollers, which comprises subjecting the roller to the action of a grinding wheel driven at high speed, and directing an atomized spray of air and water in slight amount onto the roller at approximately the area of contact between said grinding wheel and said roller.

11. The method of finishing rollers, which comprises subjecting the roller to the action of a coarse grinding wheel driven at high speed, and directing an atomized spray of air and water in slight amount onto the roller at approximately the area of contact between said grinding wheel and said roller.

12. The method of finishing rubber articles, which comprises subjecting the article to the action of a grinding wheel driven at high speed, and directing an atomized spray of air and water in slight amount onto the article at approximately the area of contact between said grinding wheel and said article.

13. The method of finishing rubber articles, which comprises subjecting the article to the action of a coarse grinding wheel driven at high speed, and directing an atomized spray of air and water in slight amount onto the article at approximately the area of contact between said grinding wheel and said article.

14. The method of finishing rubber rollers, which comprises subjecting the roller first to the action of a coarse grinding wheel and then to the action of a relatively fine polishing wheel both driven at high speed and as a continuous operation, while rotating the roller at relatively low speed and imparting relative movement to said wheels and said roller lengthwise of the latter, and directing onto the areas of the roller being ground and polished, respectively, an atomized spray of air and water in slight amount.

15. The method of finishing rubber rollers, which comprises subjecting the roller first to the action of a grinding wheel driven at high speed and then to the action of a polishing wheel, as a continuous operation and while rotating the roller at relatively low speed and imparting relative movement to said wheels and said roller lengthwise of the latter, and directing onto the areas of the roller being ground and polished, respectively, an atomized spray of air and water in slight amount.

16. The method of finishing rubber articles, which comprises subjecting the article first to the action of a grinding wheel and then to the action of a polishing wheel, as a continuous operation, and directing onto the areas of the article being ground and polished, respectively, an atomized spray of air and water in slight amount.

ELMER J. BUSSING.